Figure 1:
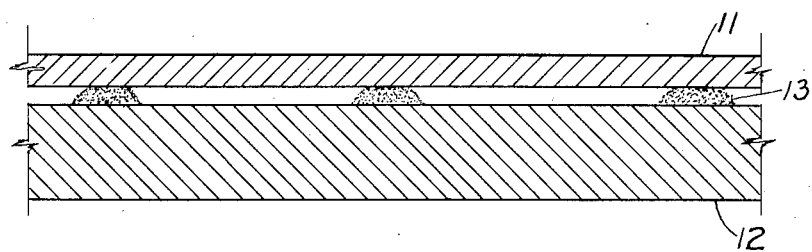

June 9, 1942.  H. R. AUSTIN  2,285,554

METHOD FOR LINING METAL ARTICLES

Filed July 25, 1940

HAROLD R. AUSTIN.
INVENTOR

BY Virgil F. Davies
ATTORNEY

Patented June 9, 1942

2,285,554

UNITED STATES PATENT OFFICE 2,285,554

METHOD FOR LINING METAL ARTICLES

Harold R. Austin, South Norwalk, Conn., assignor to The M. W. Kellogg Co., New York, N. Y., a corporation of Delaware Application July 25, 1940, Serial No. 347,383

6 Claims. (Cl. 219—10)

This invention relates to the manufacture of lined metal articles and in particular to a method for uniting metal linings to the base metal of the articles.

It has become common practice in the petroleum refining, the chemical, and the processing arts to make the portions of apparatus exposed to contact with corrosive media out of alloys of special analyses that resist the corrosive media. Sometimes the resistant alloys are employed for the full thickness of the apparatus wall. More generally, the major portion of the thickness of the apparatus wall is made of one of the ordinary materials of construction, such as carbon steel, low alloy steel, etc., and a minor portion of the thickness of the apparatus wall is made of resistant alloy.

Lined apparatus is produced in various ways. Some manufacturers employ composite metal as the material of construction while others employ the ordinary materials of construction as base metal and unite to such base metal, at an appropriate stage in the manufacture, a lining of the resistant alloy. The base and the lining are united by welding at spaced points or along spaced lines or both. Electric arc welding and electric spot resistance welding have both been employed for this purpose. Electric spot resistance welding is now generally used.

In effecting a bond between the lining metal and the base metal by electric spot, or line, resistance welding a depth of the metal of the base and a depth of the metal of the lining at the interface of the metals is fused, the fused metals commingle and upon solidification unite the lining and the base. The bonding metal since it is a result of the intermingling of base metal and lining metal is not of the same analyses and does not have the same properties as either the lining metal or the base metal. Thus, the effective thickness of the lining is reduced by the depth that the bonding metal extends into the lining. This means that for a particular set of conditions the thickness of the lining used must be greater than the thickness required by the conditions. The effective thickness of linings of resistant alloys, even for severe service, need seldom be much thicker than a few 64ths of an inch; since the bonding metal will generally extend into the lining metal several 64ths of an inch, the lining used will often be twice as thick as the required effective thickness. While electric spot, or line, resistance welding can be controlled, the control is not so accurate but that at times the bonding metal will extend into the lining metal as much as 100% more than the predetermined amount. Thus, even when the linings are over-designed the life of lining is not predictable with certainty.

The bonding metal is not only less corrosion resistant than the lining metal but oftentimes has properties that make a satisfactory bond difficult to obtain. Thus, when the lining is made of austenitic chromium-nickel-iron alloys, 18 chromium-8 nickel for instance, or high chromium iron alloys, i. e., chromium iron alloys containing more than 12% chromium, the bonding metal has pronounced air hardening properties and cracks in the bonding metal are not unusual. Since the lining covers the bonding metal, cracks cannot be detected by ordinary inspection and are generally first noted when the bond fails and the lining pulls away from the base metal. It is the present practice to compensate for bond failure due to air hardening by materially increasing the bonded area over that required.

I have found a simple and efficient way of avoiding these inherent deficiencies and defects.

It is an object of this invention to provide a method for uniting lining metal to the base metal of an article by electric spot, or line, resistance welding wherein the dilution of the lining metal by the base metal is compensated for.

It is a further object of this invention to provide a lined article having a corrosion resistant alloy lining metal united to a ferrous metal base by electric spot, or line, resistance welding, the bonding metal being of substantially the same analysis as the lining metal.

It is a still further object of this invention to provide a method for uniting lining metal to the base metal of an article by electric spot, or line, resistance welding wherein constituents of the lining metal are added to the melt resulting from the fusion of the lining metal and the base metal to compensate for dilution of the lining metal by the base metal and to provide bonding metal of substantially the same analysis as the lining metal.

Figure 2:
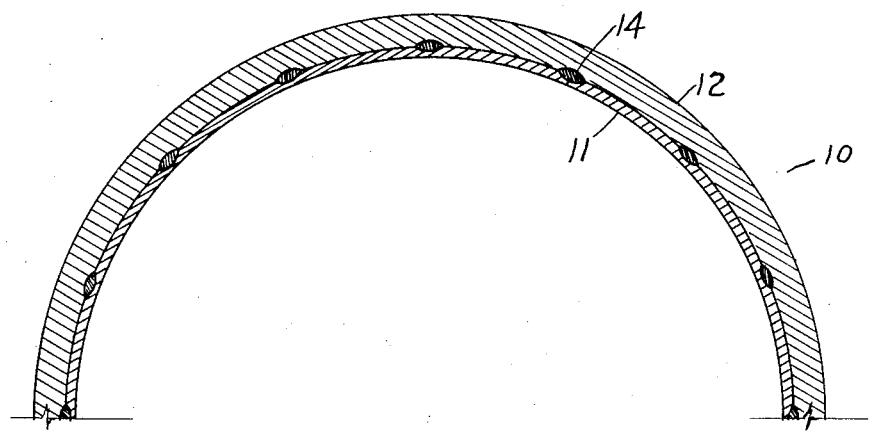

The further objects and advantages of the invention will be apparent from a consideration of the following description of a present preferred way of carrying the invention out in practice, taken with the accompanying drawing, in which, Fig. 1 is a fragmentary sectional view showing the base metal and the lining metal assembled with the added material between them prior to the electric spot, or line, welding operation, and Fig. 2 is a fragmentary sectional view of a pressure vessel formed from the metal of Fig. 1, after the resistance welding operation.

The invention while of general application is best adapted to the manufacture, by electric spot, or line, resistance welding, of lined articles whose base metal and lining metal, while of different analysis, include one or more common constituents which are present in the base metal in major proportion.

While a variety of base metals and lining metals are contemplated, the invention will be described in connection with the manufacture of articles composed of a ferrous base and a ferrous alloy lining. The base metal may be plain carbon steel or low alloy steel. The lining metal, since protection against corrosion is the usual aim, may be any of the ferrous alloys of superior corrosion resistance suitable for the intended service. Alloys such as the austenitic chromium-nickel-iron alloys, for example 18 chromium-8 nickel with or without additions of titanium, columbium, molybdenum, etc., and the chromium iron alloys, those containing more than 12% chromium, and the like are the alloys usually employed.

The lining metal may be united to the base metal at any preferred point in the manufacture of the article but in the manufacture of shaped articles such as pressure vessels it is preferred to unite the lining metal to the base metal while the base metal is in the form of flat sheets or plates.

Thus, in the manufacture of pressure vessel 10 lining metal 11 is united to base metal 12 while the base metal 12 is in the form of a flat sheet or a flat plate. Prior to the welding added material 13 is placed on the surface of the plate 12 that is to be covered with lining 11.

Material 13 may be placed to cover the whole surface of plate 12 or it may be placed along lines or in mounds to cover those portions of the surface that are to be fused during the subsequent welding. When less than the whole surface of plate 12 is covered with material 13 it has been found convenient to perforate a sheet of appropriate thickness in the pattern required and, after applying the perforated sheet to plate 12, to fill the perforations with material 13. After the perforated sheet is removed the surface of plate 12 will be properly covered and the depth of material 13 will be as predetermined.

Material 13 will usually be in the particle form and will be composed of the constituents required to compensate for the dilution of the lining metal by the base metal. Thus, when lining 11 is made of austenitic chromium-nickel steel material 13 will be made up of nickel and ferrochrome; when lining 11 is made of chrome steel material 13 will be made up of ferrochrome. Material 13 may also include other constituents. Thus, when lining 11 is of austenitic chromium-nickel steel that contains elements such as columbium, molybdenum, titanium, etc. material 13 will also contain such elements preferably in the form of their ferro alloys. Ferro alloys of titanium and columbium are also included beyond the amounts required to equal their percentage in the lining metal when it is desired, because of carbon pick up from the base, to stabilize chromium bearing weld metal 14 against intergranular corrosion. Material 13 may also include constituents which improve the metallurgical properties of weld metal 14. Thus, ferro-manganese, ferro-silicon. etc. may be included in material 13.

The percentages and the quantities of the various constituents of material 13, in each instance, will be chosen to give the desired results. Since the conditions can vary widely it is not possible to set out by formulae the manner of arriving at the percentages and quantities. However, in any case it is a simple matter to determine these percentages and quantities. Thus, in any particular case the analyses of the base and lining metals will be known and the amount of each of them fused during welding can be readily determined. With this information it is a simple matter to calculate the quantities of constituents required to compensate for the dilution of the alloy metal by the base metal. With the analyses of the base and lining metals and the quantities fused it is also a simple matter to arrive at the quantities of the elements required to stabilize the chromium bearing alloys against intergranular corrosion.

As to manganese and silicon and such elements that improve the physical properties of the weld metal 14 experience will indicate the amounts required for the desired results.

After material 13 of proper composition and in proper quantity has been placed on the surface of plate 12, as stated above, lining 11 is positioned and the electric spot, or line, resistance welding performed. Electric spot, or line, resistance welding, sometimes referred to as progressive spot welding is well known and it would serve no useful purpose to describe it in detail here.

During the welding operation metal of lining 11, material 13 and metal of plate 12, between the electrodes, fuse together and intermingle to produce weld metal 14. Metal 14 will be of substantially the same analysis and corrosion resistance as the metal of lining 11. Thus, the full thickness of lining 11 is the effective thickness and lining 11 need be only of the thickness required for the predetermined life of the vessel. This is true even if, as sometimes happens, weld metal 14 extends to the surface of lining 11 that is exposed to attack in service.

The total amount of welded area can also be substantially reduced for weld metal 14 being of substantially the same analysis as lining 11 will have predictable properties.

After the electric spot, or line resistance welding the lined plate is shaped as required and formed into the desired pressure vessel 10 in the usual manner.

I claim:

1. In the method of uniting, by electric resistance welding, an alloy liner sheet to a body of base metal of different analysis to protect a surface of the body of base metal, the steps comprising, positioning a material made up of constituents of the liner sheet on the surface to be lined, placing the liner sheet over the surface to be lined to cover said material, and electric resistance welding the liner sheet to the body of base metal at the position of said material to unite the liner sheet and base metal by weld metal derived from the liner sheet, the base metal and said material, the liner sheet and the base metal having at least one common constituent which is present in the base metal in major proportion, said material containing constituents of the liner sheet in quantities sufficient to substantially compensate for dilution during welding of the liner metal by the base metal, whereby the weld metal is of substantially the same composition as the liner metal.

2. In the method of uniting, by electric resistance welding, an alloy liner sheet to a body of base metal of different analysis to protect a surface of the body of base metal, the steps comprising, positioning metal in particle form on the surface to be lined to cover the portions of the body of base metal fused during welding, placing the liner sheet over the surface to be lined to cover said metal in particle form, and uniting the liner sheet to the base metal by electric resistance welding at the position of said metal in the particle form, said metal in particle form being made up of constituents which when intermingled during the welding with the fused metals of the liner sheet and the base metal produce weld metal having properties and characteristics approximating those of the liner.

3. In the method of uniting, by electric resistance welding, a ferrous alloy liner sheet of superior corrosion resistance in service to a body of steel base metal to protect a surface of said body, the steps comprising, positioning metal in the particle form on the surface to be lined to cover the portions of said body fused during welding, placing the ferrous alloy liner sheet on the surface to be lined to cover the metal in particle form, and electric resistance welding said liner sheet to said body at the position of said metal in particle form to unite said liner sheet and said body by weld metal derived from said liner, said metal in particle form and said body, said metal in particle form being made up of constituents of the alloy liner sheet in quantities sufficient to produce weld metal of substantially the same analysis and corrosion resistance as the liner sheet.

4. In the method of uniting, by electric resistance welding, a chromium containing ferrous alloy liner sheet of superior corrosion resistance to a body of steel base metal of lower corrosion resistance to protect a surface of the steel base metal, the steps comprising, positioning metal in particle form on the surface to be lined to cover the portions of the steel base metal fused during welding, placing the chromium containing ferrous alloy sheet on the surface to be lined to cover the metal in particle form, and electric resistance welding the alloy liner sheet to said steel base metal at the position of said metal in particle form to unite the alloy liner sheet and said steel base metal by weld metal derived from the alloy liner sheet, said metal in particle form and said steel base metal, said metal in particle form including the constituents of the alloy liner sheet in quantities sufficient to produce weld metal of an analysis approximating that of the alloy liner sheet and sufficient quantities of an element capable of forming stable compounds in the presence of chromium with substantially all of the carbon of the weld metal to stabilize the weld metal against intergranular corrosion.

5. In the method of uniting, by electric resistance welding, a ferrous alloy liner of superior corrosion resistance to a body of steel base metal to protect a surface of the steel base metal, the steps comprising, positioning metal in particle form on the surface to be lined to cover the portions of the steel base metal fused during welding, placing the ferrous alloy liner on the surface to be lined to cover the metal in particle form, and uniting the alloy liner to the steel base by electric resistance welding at the position of the metal in particle form, the metal in particle form including constituents of the ferrous alloy liner and manganese in quantity sufficient to produce weld metal having a workability comparable to that of the ferrous alloy.

6. In the method of uniting, by electric resistance welding, a chromium containing ferrous alloy liner sheet to a body of steel base metal to protect a surface of the steel base metal, the steps comprising, positioning metal in particle form on the surface to be lined to cover the portions of the steel base metal fused during welding, placing the chromium containing ferrous alloy liner sheet on the surface to be lined to cover the metal in particle form, and uniting the alloy liner to the steel base by electric resistance welding at the position of the metal in particle form, the metal in particle form including constituents of the liner metal in quantity sufficient to produce weld metal non-air hardening to substantially the same degree as the liner metal.

HAROLD R. AUSTIN.